(12) United States Patent
Chiang et al.

(10) Patent No.: US 12,153,741 B1
(45) Date of Patent: Nov. 26, 2024

(54) DISPLAY ASSEMBLY, METHOD FOR OPERATING DISPLAY ASSEMBLY, AND DISPLAY

(71) Applicant: BENQ CORPORATION, Taipei (TW)

(72) Inventors: Chin-Fu Chiang, New Taipei (TW); Li-Teng Chang, New Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 18/504,065

(22) Filed: Nov. 7, 2023

(30) Foreign Application Priority Data

Jul. 20, 2023 (TW) .................................. 112127164

(51) Int. Cl.
| | |
|---|---|
| *G06F 3/023* | (2006.01) |
| *G06F 3/0489* | (2022.01) |
| *G09G 5/00* | (2006.01) |
| *G09G 5/14* | (2006.01) |

(52) U.S. Cl.
CPC .......... *G06F 3/023* (2013.01); *G06F 3/04897* (2013.01); *G09G 5/006* (2013.01); *G09G 5/14* (2013.01); *G09G 2320/0606* (2013.01); *G09G 2320/08* (2013.01); *G09G 2354/00* (2013.01)

(58) Field of Classification Search
CPC ..... G06F 3/032; G06F 3/04897; G09G 5/006; G09G 5/14; G09G 2320/0606; G09G 2320/08; G09G 2354/00
See application file for complete search history.

(56) References Cited

U.S. PATENT DOCUMENTS

| | | | | |
|---|---|---|---|---|
| 7,032,184 | B1* | 4/2006 | Choi | G06F 3/04897 |
| | | | | 715/827 |
| 10,531,079 | B2* | 1/2020 | Lin | G09G 5/006 |
| 10,939,095 | B2* | 3/2021 | Lin | G09G 3/006 |
| 11,327,521 | B1* | 5/2022 | Lei | G06F 3/04897 |
| 11,615,766 | B2* | 3/2023 | Wei | G09G 5/373 |
| | | | | 345/629 |

(Continued)

FOREIGN PATENT DOCUMENTS

| | | | |
|---|---|---|---|
| CN | 105808192 A | * | 7/2016 |
| EP | 4213014 A1 | | 7/2023 |
| TW | I788644 B | | 1/2023 |

OTHER PUBLICATIONS

Office action of counterpart application by EPO on Apr. 19, 2024.

*Primary Examiner* — Patrick F Marinelli

(57) ABSTRACT

A display assembly, a method for operating a display assembly and a display are provided. The display assembly includes a hotkey controller and a display. The hotkey controller includes a switching key and a plurality of control keys. The switching key is used for switching between an on-screen display mode and a computer hotkey mode. When the hotkey controller is in the on-screen display mode and one or more of the control keys are pressed, a screen adjustment command is generated; when the hotkey controller is in the computer hotkey mode and one or more of the control keys are pressed, a computer hotkey command is generated. The display includes a judgment unit, a screen adjustment unit, an instruction processing unit, and a data transmission unit. The instruction processing unit converts the computer hotkey command into a human interface device command for performing a hotkey operation on the computer.

20 Claims, 6 Drawing Sheets

(56) References Cited

U.S. PATENT DOCUMENTS

| | | | | |
|---|---|---|---|---|
| 2007/0152972 | A1* | 7/2007 | Zhang | G06F 3/023 |
| | | | | 345/168 |
| 2012/0235914 | A1* | 9/2012 | Hsu | G06T 3/40 |
| | | | | 345/167 |
| 2012/0262503 | A1* | 10/2012 | Lin | G09G 5/10 |
| | | | | 345/690 |
| 2014/0111552 | A1* | 4/2014 | Hsu | G06F 3/04897 |
| | | | | 345/661 |
| 2018/0234677 | A1* | 8/2018 | Lin | G09G 5/006 |
| 2019/0260985 | A1* | 8/2019 | Lin | G09G 5/006 |
| 2021/0303128 | A1* | 9/2021 | Ho | G06F 3/04812 |
| 2021/0334117 | A1* | 10/2021 | Hsieh | G06F 9/451 |
| 2022/0035518 | A1* | 2/2022 | Huang | G06F 3/038 |
| 2022/0358899 | A1* | 11/2022 | Wei | G09G 5/373 |

* cited by examiner

DISPLAY ASSEMBLY, METHOD FOR OPERATING DISPLAY ASSEMBLY, AND DISPLAY

This application claims the benefit of Taiwan application Serial No. 112127164, filed Jul. 20, 2023, the subject matter of which is incorporated herein by reference.

BACKGROUND OF THE INVENTION

Field of the Invention

The invention relates in general to an electronic device and an operation method thereof, and more particularly to a display assembly, a method for operating a display assembly and a display.

Description of the Related Art

A display can be connected to a computer (such as a desktop computer or a notebook computer) for the user to view films, browse webpages or perform word processing. The user can operate the computer with an input device such as keyboard, mouse, or touchpad.

The display has screen parameters such as brightness, contrast, and color temperature. The user can adjust on-screen display (OSD) through the adjustment button of the display or a remote controller for setting screen parameters.

The input device connected to the computer, such as keyboard, mouse, or touchpad, is different from the adjustment button or remote controller connected to the display. The signal contents of the two devices are different and cannot be shared.

SUMMARY OF THE INVENTION

The disclosure is directed to a display assembly, a method for operating a display assembly and a display, which provide a hotkey controller of a display assembly with the function of screen parameter adjustment of a display and the function of hotkey operation of a computer through suitable signal conversion.

According to one embodiment of the present disclosure, a display assembly is provided. The display assembly includes a hotkey controller and a display. The hotkey controller includes a switching key and a plurality of control keys. The switching key is used for switching between an on-screen display mode (OSD mode) and a computer hotkey mode. When the hotkey controller is in the on-screen display mode and one or more of the control keys are pressed, a screen adjustment command is generated; when the hotkey controller is in the computer hotkey mode and one or more of the control keys are pressed, a computer hotkey command is generated. The display includes a judgment unit, a screen adjustment unit, an instruction processing unit, and a data transmission unit. The judgment unit is used for determining whether the received command is the screen adjustment command or the computer hotkey command. The screen adjustment unit is used for adjusting at least one screen parameter according to the screen adjustment command. The instruction processing unit is used for converting the computer hotkey command into a human interface device (HID) command. The data transmission unit is connected to a computer. The human interface device command is transmitted to the computer by the data transmission unit for performing a hotkey operation on the computer.

According to another embodiment of the present disclosure, a method for operating a display assembly is provided. The display assembly includes a hotkey controller and a display. The method includes the following steps. Whether the hotkey controller is in an on-screen display mode or a computer hotkey mode is determined according to a switching key of the hotkey controller. When the hotkey controller is in the on-screen display mode and one or more of a plurality of control keys of the hotkey controller are pressed, a screen adjustment command is generated. When the hotkey controller is in the computer hotkey mode and one or more of the control keys of the hotkey controller are pressed, a computer hotkey command is generated. The screen adjustment command or the computer hotkey command is transmitted to the display. The display determines whether the received command is the screen adjustment command or the computer hotkey command. If the display receives the screen adjustment command, at least one screen parameter is adjusted according to the screen adjustment command. If the display receives the computer hotkey command, the computer hotkey command is converted into a human interface device command. The human interface device command is transmitted to a computer for performing a hotkey operation on the computer.

According to an alternate embodiment of the present disclosure, a display is provided. The display includes a judgment unit, a screen adjustment unit, an instruction processing unit, and a data transmission unit. The judgment unit is used for determining whether the command received from a hotkey controller is a screen adjustment command or a computer hotkey command to determine whether the hotkey controller is in an on-screen display mode or a computer hotkey mode. The screen adjustment unit is used for adjusting at least one screen parameter according to the screen adjustment command. The instruction processing unit is connected to a computer and used for converting the computer hotkey command into a human interface device command. The human interface device command is transmitted to the computer by the data transmission unit for performing a hotkey operation on the computer.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
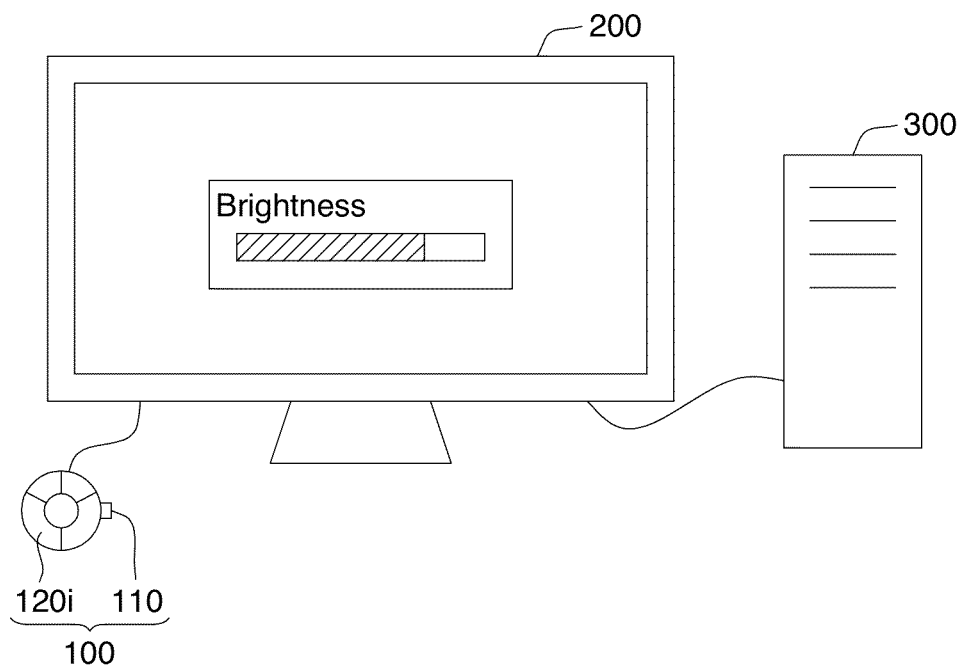
FIG. 1 is a schematic diagram of a display assembly performing a screen parameter adjustment on a display according to an embodiment.

Referring to FIG. 1, a schematic diagram of a display assembly 1000 performing a screen parameter adjustment on a display 200 according to an embodiment is shown. The display assembly 1000 includes a hotkey controller 100, the display 200 and a computer 300. The hotkey controller 100 is connected to the display 200 and can be realized by such as a wired remote controller or a wireless remote controller externally connected to the display 200 or a button group inbuilt on the casing of the display 200. The display 200 can be realized by a liquid crystal display, an e-paper display, a projector, or an OLED display. The computer 300 can be realized by a desktop computer, a notebook computer, or a minicomputer host.

As indicated in FIG. 1, the user can perform the screen parameter adjustment on the display 200 using the hotkey controller 100. The hotkey controller 100 includes a plurality of control keys 120*i*, each corresponding to a predefined control option (such as brightness, contrast, or color temperature) and control operation (such as increase or decrease).

Figure 2:
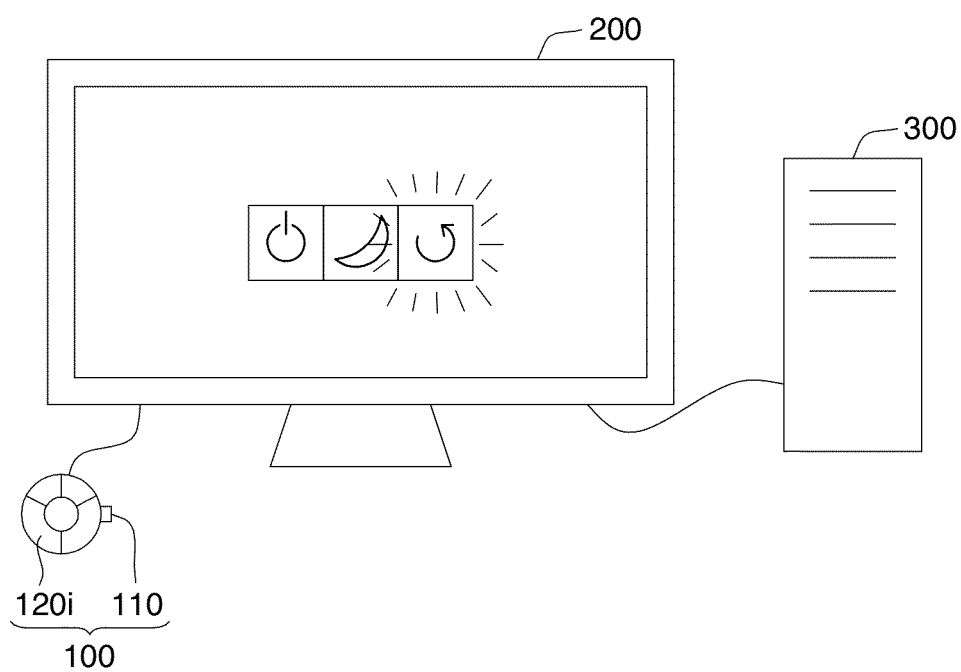
FIG. 2 is a schematic diagram of the display assembly performing a hotkey operation on a computer according to an embodiment.

Referring to FIG. 2, a schematic diagram of a display assembly 1000 performing a hotkey operation on the computer 300 according to an embodiment is shown. In the present embodiment, the user can perform a hotkey operation of the computer 300 using the hotkey controller 100. Each of the control keys 120*i* of the hotkey controller 100 corresponds to a predefined hotkey operation (such as shutdown, sleep, re-boot, copy, or paste).

Figure 3:
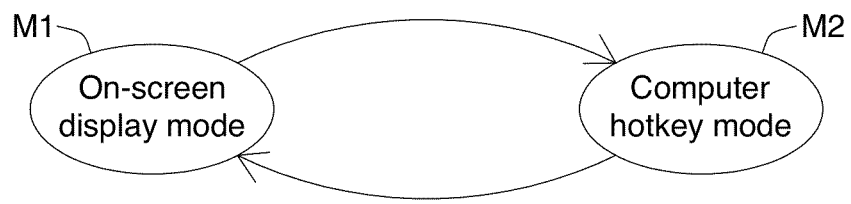
FIG. 3 is a state machine diagram of a hotkey controller according to an embodiment.

Refer to FIGS. 1 to 3. FIG. 3 is a state machine diagram of the hotkey controller 100 according to an embodiment. As indicated in FIG. 1 and FIG. 2, the hotkey controller 100 includes a switching key 110. The switching key 110 is used for switching the control modes of the hotkey controller 100. As indicated in FIG. 3, the hotkey controller 100 has an on-screen display mode M1 and a computer hotkey mode M2. The user can switch the hotkey controller 100 between the on-screen display mode M1 and the computer hotkey mode M2 through the switching key 110. When the hotkey controller 100 is in the on-screen display mode M1, a screen parameter of the display 200 is adjusted in response to the pressing operation of the hotkey controller 100. When the hotkey controller 100 is in the computer hotkey mode M2, a hotkey operation of the computer 300 is performed in response to the pressing operation of the hotkey controller 100.

That is, the hotkey controller 100 of the present embodiment is provided with both the function of the screen parameter adjustment of the display 200 and the function of the hotkey operation of the computer 300. The two functions require different signal contents. Through suitable signal conversion, the hotkey controller 100 can provide dual functions.

Figure 4:
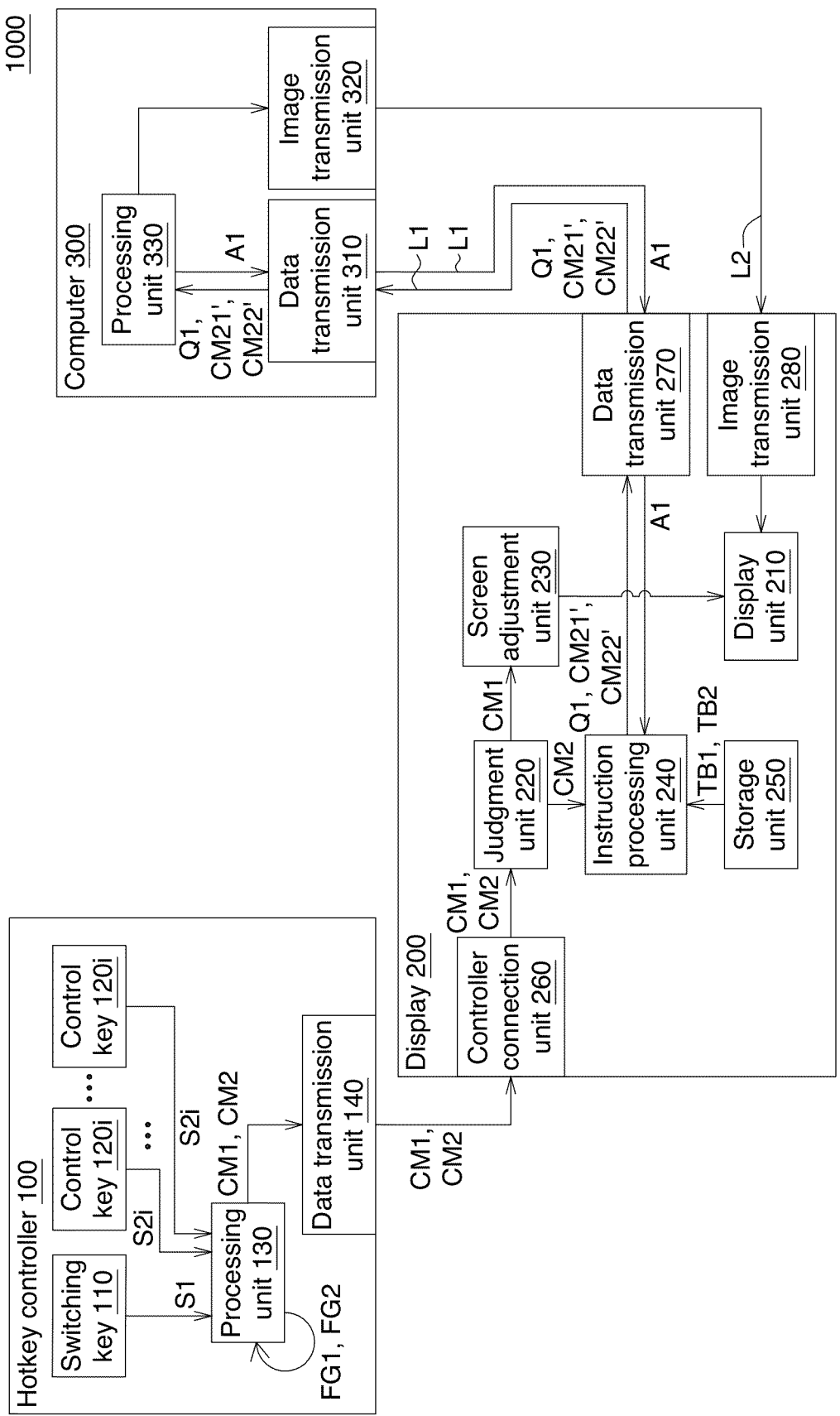
FIG. 4 is a block diagram of a display assembly according to an embodiment.

Referring to FIG. 4, a block diagram of the display assembly 1000 according to an embodiment is shown. The display assembly 1000 includes the hotkey controller 100, the display 200 and the computer 300. The hotkey controller 100 includes the switching key 110, the plurality of control keys 120*i*, a processing unit 130 and a data transmission unit 140. The switching key 110 is used for switching the mode of the hotkey controller 100 and can be realized by a joystick, a rebound button, or a touch-sensitive pad. The user can input signals by pressing, touching, or rotating the control key 120*i* which can be realized by a rebound button, a touch-sensitive pad, a 360 steering rod, a turntable, or a roller. The processing unit 130 is used for performing various processing procedures or judgement procedures and can be realized by a circuit, a chip, a circuit board or a storage device for storing program code. The data transmission unit 140 is connected to the display 200 and can be realized by a USB port, a Bluetooth communication module, an infra-red transmission module or a WIFI transmission module.

The display 200 includes a display unit 210, a judgment unit 220, a screen adjustment unit 230, an instruction processing unit 240, a storage unit 250, a controller connection unit 260, a data transmission unit 270 and an image transmission unit 280. The display unit 210 is used for displaying frames and can be realized by a display unit, a projection lens, or a camera module. The judgment unit 220 is used for performing a judgement procedure. The screen adjustment unit 230 is used for performing a screen adjustment procedure. The instruction processing unit 240 is used for processing commands. The judgment unit 220, the screen adjustment unit 230 and/or the instruction processing unit 240 can be realized by a circuit, a chip, a circuit board, or a storage device for storing program code. The controller connection unit 260 is used for connecting to the hotkey controller 100 and can be realized by a USB port, a Bluetooth communication module, an infra-red transmission module or a WIFI transmission module. The data transmission unit 270 is used for transmitting commands and can be realized by a USB port, a Bluetooth communication module, an infra-red transmission module or a WIFI transmission module. The image transmission unit 280 is used for receiving images and can be realized by a D-SUB port, a DVI-D port, an HDMI port, a display port, a type-C port, a Bluetooth communication module, or a WIFI transmission module. Although the data transmission unit 270 and the image transmission unit 280 are both connected to the computer 300, they operate independently, and their transmission contents are not the same. Even when the data transmission unit 270 and the image transmission unit 280 adopt the same type of port, the data transmission line L1 connected to the data transmission unit 270 is different from the image transmission line L2 connected to the image transmission unit 280. Even when the data transmission unit 270 and the image transmission unit 280 adopt the same type of transmission module, the data transmission channel adopted by the data transmission unit 270 is different from the image transmission channel adopted by the image transmission unit 280.

The computer 300 includes a data transmission unit 310, an image transmission unit 320 and a processing unit 330. The data transmission unit 310 is used for receiving commands and can be realized by a USB port, a Bluetooth communication module, an infra-red transmission module or a WIFI transmission module. The image transmission unit 320 is used for transmitting images and can be realized by a D-SUB port, a DVI-D port, a HDMI port, a display port, a type-C port, a Bluetooth communication module, or a WIFI transmission module. Although the data transmission unit 310 and the image transmission unit 320 both are connected to the display 200, they operate independently, and their transmission contents are not the same. Even when the data transmission unit 310 and the image transmission unit 320 adopt the same type of port, the data transmission line L1 connected to the data transmission unit 310 is different from the image transmission line L2 connected to the image transmission unit 320. Even when the data transmission unit 310 and the image transmission unit 320 adopt the same type of transmission module, the data transmission channel adopted by the data transmission unit 310 is different from the image transmission channel adopted by the image transmission unit 320. The processing unit 330 is used for performing various processing procedures, analysis procedures or control procedures and can be realized by a circuit, a chip, a circuit board, or a storage device for storing program code.

In the present embodiment, through the above elements, the display 200 can receive a screen adjustment command CM1 or a computer hotkey command CM2 from the hotkey controller 100. When the display 200 receives the screen adjustment command CM1, the display 200 can perform the screen parameter adjustment; when the display 200 receives the computer hotkey command CM2, the display 200 can automatically perform command conversion and transmit the converted command to the computer 300 for the computer 300 to perform a hotkey operation. The operations of various elements are described below with an accompanying flowchart.

Figure 5A:
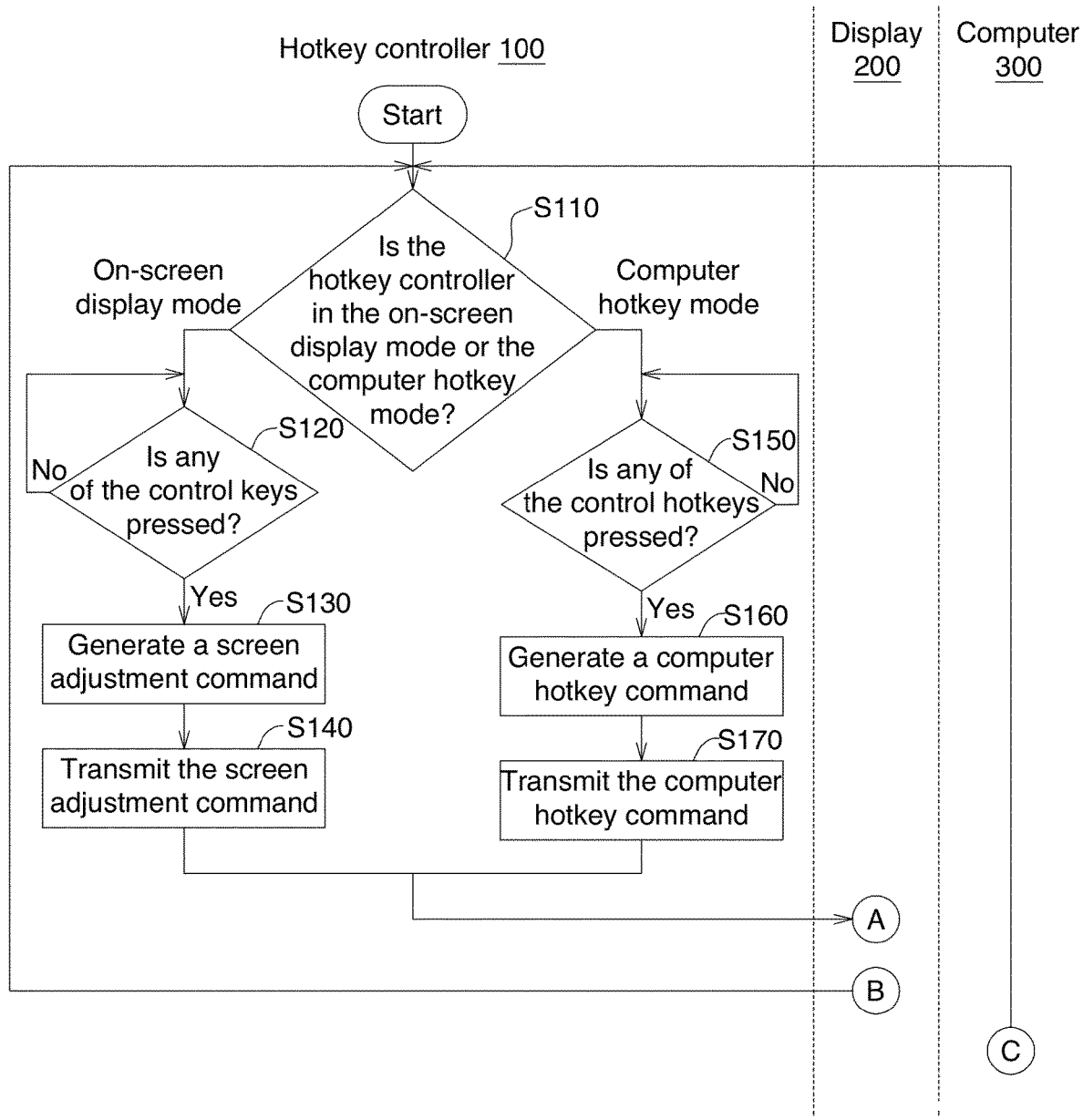
FIGS. 5A to 5C are flowcharts of a method for operating the display assembly according to an embodiment.
Figure 5B:
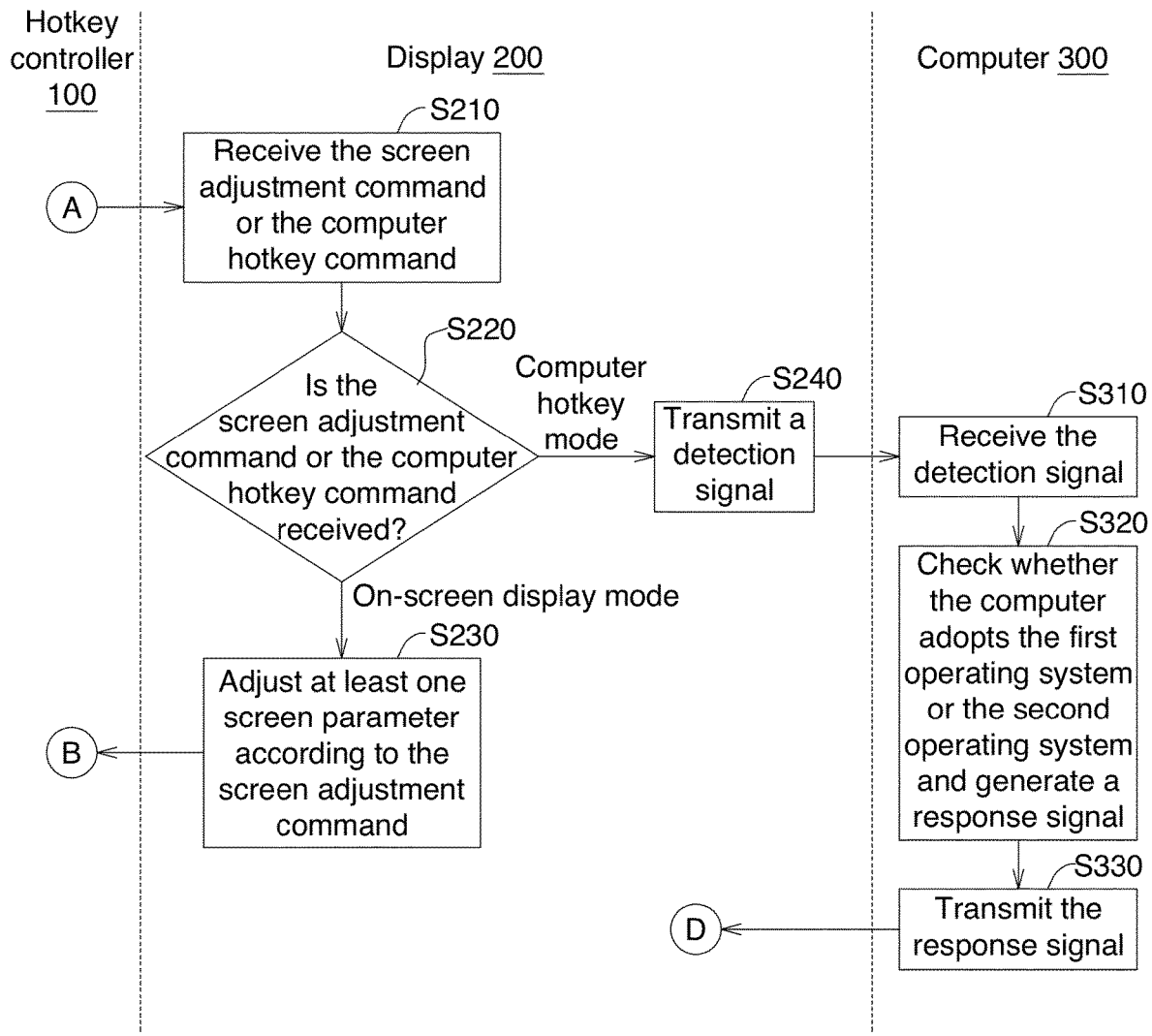
Figure 5C:
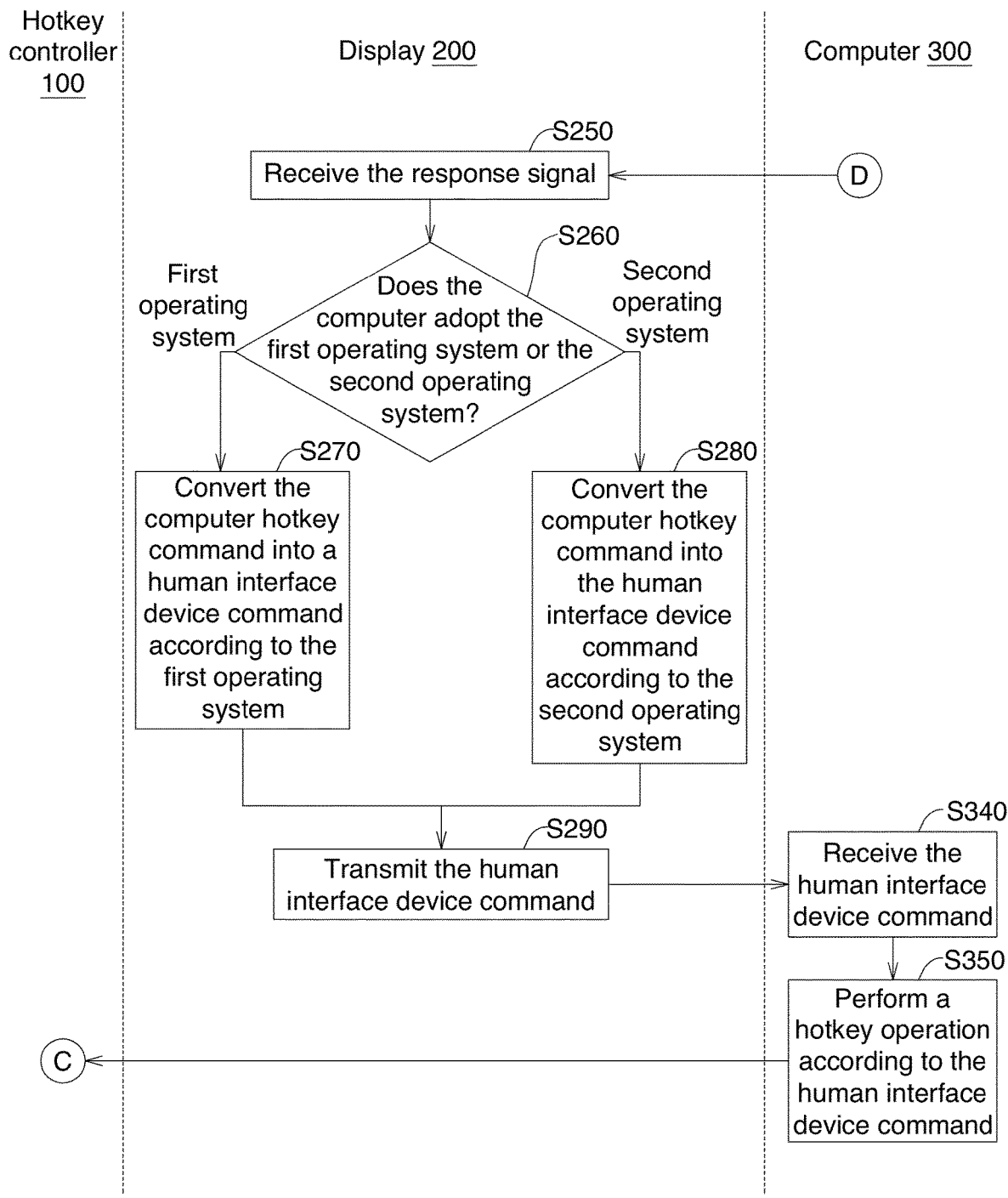

Referring to FIGS. 5A to 5C, flowcharts of a method for operating the display assembly 1000 according to an embodiment are shown. In step S110, whether the hotkey controller 100 is in the on-screen display mode M1 or the computer hotkey mode M2 is determined by the processing unit 130 of the hotkey controller 100 according to the switching key 110. For instance, when the switching key 110 is switched, a switching signal S1 is transmitted to the processing unit 130. After receiving the switching signal S1, the processing unit 130 can switch between the on-screen display mode M1 and the computer hotkey mode M2; or, the switching key 110 can output different mode signals (not illustrated) to the processing unit 130 according to the switching positions. After receiving the mode signal, the processing unit 130 can determine whether the hotkey controller 100 is in the on-screen display mode M1 or the computer hotkey mode M2. Or, the processing unit 130 can trigger and output an activation signal (not illustrated) to the processing unit 130 only when the switching key 110 is switched to a predetermined position. Only after receiving the activation signal will the processing unit 130 switch the hotkey controller 100 to the computer hotkey mode M2.

If the hotkey controller 100 is in the on-screen display mode M1, the method proceeds to step S120; if the hotkey controller 100 is in the computer hotkey mode M2, the method proceeds to step S150.

In step S120, whether any of the control keys 120i of the hotkey controller 100 is pressed is determined by the processing unit 130 of the hotkey controller 100. When any of the control keys 120i is pressed, a pressing signal S2i is outputted to the processing unit 130. If one or more control keys 120i are pressed, the method proceeds to step S130.

In step S130, the screen adjustment command CM1 is generated by the processing unit 130 of the hotkey controller 100. In the present step, a first flag FG1 is added to the pressing signal S2i by the processing unit 130 to generate the screen adjustment command CM1. The first flag FG1 can be added before or after the pressing signal S2i.

Then, the method proceeds to step S140, the screen adjustment command CM1 is transmitted to the display 200 by the hotkey controller 100 through the data transmission unit 140.

In step S110, when it is determined that the hotkey controller 100 is in the computer hotkey mode M2 so that the method proceeds to step S150, the processing unit 130 of the hotkey controller 100 determines whether any of the control keys 120i of the hotkey controller 100 is pressed. If any of the control keys 120i is pressed, a pressing signal S2i is outputted to the processing unit 130. If one or more control keys 120i are pressed, the method proceeds to step S160.

In step S160, the computer hotkey command CM2 is generated by the processing unit 130 of the hotkey controller 100. In the present step, a second flag FG2 is added to the pressing signal S2i by the processing unit 130 to generate the computer hotkey command CM2. The second flag FG2 can be added before or after the pressing signal S2i.

Then, the method proceeds to step S170, the computer hotkey command CM2 is transmitted to the display 200 by the hotkey controller 100 through the data transmission unit 140.

Following step S140 and step S170, the method proceeds to step S210. In step S210, the screen adjustment command CM1 or the computer hotkey command CM2 is received by the display 200 through the controller connection unit 260. In the present step, the controller connection unit 260 simply receives information then transmits the received information to the judgment unit 220.

Then, the method proceeds to step S220, whether the received command is the screen adjustment command CM1 or the computer hotkey command CM2 is determined by the judgment unit 220 of the display 200. In the present step, whether the received command is the screen adjustment command CM1 or the computer hotkey command CM2 is determined by the judgment unit 220 according to the first flag FG1 or the second flag FG2. If the screen adjustment command CM1 is received, the method proceeds to step S230. If the computer hotkey command CM2 is received, the method proceeds to step S240.

In step S230, adjustment on at least one screen parameter is performed by the screen adjustment unit 230 of the display 200 according to the screen adjustment command CM1.

In step S240, a detection signal Q1 is transmitted to the computer 300 by the instruction processing unit 240 of the display 200 through the data transmission unit 270 to detect whether the computer 300 adopts the first operating system or the second operating system.

Then, the method proceeds to step S310, the detection signal Q1 is received by the computer 300 through the data transmission unit 310.

Afterwards, the method proceeds to step S320, whether the computer 300 adopts the first operating system or the second operating system is checked by the processing unit 330 of the computer 300 according to the detection signal Q1, and a response signal A1 is generated by the same.

Then, the method proceeds to step S330, the response signal A1 is transmitted to the display 200 by the computer 300 through the data transmission unit 310.

Afterwards, the method proceeds to step S250, the response signal A1 is received by the display 200 through the data transmission unit 270.

Then, the method proceeds to step S260, whether the computer 300 adopts the first operating system or the second operating system is determined by the instruction processing unit 240 of the display 200 according to the response signal A1. If the computer 300 adopts the first operating system, the method proceeds to step S270; if the computer 300 adopts the second operating system, the method proceeds to step S280.

In step S270, the computer hotkey command CM2 is converted into a human interface device command CM21' by the instruction processing unit 240 of the display 200 according to the first operating system. In the present step, a command conversion table TB1 corresponding to the first operating system is stored to the storage unit 250 of the display 200, and the computer hotkey command CM2 is converted into the human interface device command CM21' by the instruction processing unit 240 according to the command conversion table TB1.

In step S280, the computer hotkey command CM2 is converted into a human interface device command CM22' by the instruction processing unit 240 of the display 200 according to the second operating system. In the present step, a command conversion table TB2 corresponding to the second operating system is stored to the storage unit 250 of the display 200, and the computer hotkey command CM2 is converted into the human interface device command CM22' by the instruction processing unit 240 according to the command conversion table TB2.

Then, the method proceeds to step S290, the human interface device command CM21' or the human interface device command CM22' is transmitted to the computer 300 by the display 200 through the data transmission unit 270. In the present step, the data transmission unit 270 used by the display 200 can be realized by a USB port. The data transmission unit 270 transmits the human interface device command CM21' or the human interface device command CM22' through the data transmission line L1. The data transmission line L1 is different from the image transmission line L2 connecting the display 200 and the computer 300.

Afterwards, the method proceeds to step S340, the human interface device command CM21' or the human interface device command CM22' is received by the data transmission unit 310 of the computer 300. In the present step, the data transmission unit 310 used by the computer 300 can be realized by a USB port. The data transmission unit 310 receives the human interface device command CM21' or the human interface device command CM22' through the data transmission line L1. The data transmission line L1 is different from the image transmission line L2 connecting the computer 300 and the display 200.

Then, the method proceeds to step S350, the hotkey operation (such as shutdown, sleep, re-boot, copy, or paste) is performed by the processing unit 330 of the computer 300 according to the human interface device command CM21' or the human interface device command CM22'.

Through the above steps, the hotkey controller 100 is provided with both the function of the screen parameter adjustment of the display 200 and the function of the hotkey operation of the computer 300. The display 200 can receive the screen adjustment command CM1 or the computer hotkey command CM2 from the hotkey controller 100. When the display 200 receives the screen adjustment command CM1, the display 200 can adjust screen parameter; when the display 200 receives the human interface device command CM21' or the human interface device command CM22', the display 200 can automatically perform command conversion and transmit the converted command to the computer 300 for the computer 300 to perform a hotkey operation. Through suitable signal conversion, the hotkey controller 100 of the present disclosure can provide dual functions.

To summarize, a display assembly, a method for operating a display assembly and a display are provided in the present invention. The display assembly includes a hotkey controller and the display. The hotkey controller includes a switching key and a plurality of control keys. The switching key is used for switching between the on-screen display mode or the computer hotkey mode. When the hotkey controller is in the on-screen display mode and one or more of the control keys are pressed, a screen adjustment command is generated; when the hotkey controller is in the computer hotkey mode and one or more of the control keys are pressed, a computer hotkey command is generated. The display includes a judgment unit, a screen adjustment unit, an instruction processing unit, and a data transmission unit. The instruction processing unit is used for converting the computer hotkey command into a human interface device command for performing a hotkey operation on the computer. Thus, through suitable signal conversion, the hotkey controller of the display assembly is provided with both the function of screen parameter adjustment of the display and the function of hotkey operation of the computer.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display assembly, comprising:
   a hotkey controller, comprising:
      a switching key, used for switching between an on-screen display mode (OSD mode) and a computer hotkey mode; and
      a plurality of control keys, wherein when the hotkey controller is in the on-screen display mode and one or more of the control keys are pressed, a screen adjustment command is generated; when the hotkey controller is in the computer hotkey mode and one or more of the control keys are pressed, a computer hotkey command is generated; and
   a display, comprising:
      a judgment unit, used for determining whether a received command is the screen adjustment command or the computer hotkey command;
      a screen adjustment unit, used for adjusting at least one screen parameter according to the screen adjustment command;
      an instruction processing unit, used for converting the computer hotkey command into a human interface device (HID) command; and
      a data transmission unit, connected to a computer, wherein the human interface device command is transmitted to the computer by the data transmission unit for performing a hotkey operation on the computer.

2. The display assembly according to claim 1, wherein the instruction processing unit detects whether the computer adopts a first operating system or a second operating system, if the computer adopts the first operating system, the instruction processing unit converts the computer hotkey command into the human interface device command according to the first operating system; if the computer adopts the second operating system, the instruction processing unit converts the computer hotkey command into the human interface device command according to the second operating system.

3. The display assembly according to claim 1, wherein the data transmission unit is a USB port and transmits the human interface device command through a data transmission line.

4. The display assembly according to claim 3, wherein the data transmission line is different from an image transmission line connecting the display and the computer.

5. The display assembly according to claim 1, wherein the data transmission unit is an infra-red transmission module and transmits the human interface device command through an infra-red signal.

6. The display assembly according to claim 1, wherein the display further comprises:
   a storage unit, used for storing a command conversion table, wherein the instruction processing unit converts the computer hotkey command into the human interface device command according to the command conversion table.

7. The display assembly according to claim 1, wherein the screen adjustment command has a first flag, the computer hotkey command has a second flag, and the judgment unit determines whether the received command is the screen adjustment command or the computer hotkey command according to the first flag or the second flag.

8. A method for operating a display assembly, wherein the display assembly comprises a hotkey controller and a display, and the method comprises:
   determining whether the hotkey controller is in an on-screen display mode or a computer hotkey mode according to a switching key of the hotkey controller;
   generating a screen adjustment command, when the hotkey controller is in the on-screen display mode and one or more of a plurality of control keys of the hotkey controller are pressed;
   generating a computer hotkey command, when the hotkey controller is in the computer hotkey mode and one or more of the control keys of the hotkey controller are pressed;
   transmitting the screen adjustment command or the computer hotkey command to the display;
   determining, by the display, whether a received command is the screen adjustment command or the computer hotkey command;
   adjusting at least one screen parameter according to the screen adjustment command, if the display receives the screen adjustment command;
   converting the computer hotkey command into a human interface device command, if the display receives the computer hotkey command; and
   transmitting the human interface device command to a computer for performing a hotkey operation on the computer.

9. The method for operating the display assembly according to claim 8, wherein the display detects whether the computer adopts a first operating system or a second operating system; if the computer adopts the first operating system, the display converts the computer hotkey command into the human interface device command according to the first operating system; if the computer adopts the second operating system, the display converts the computer hotkey command into the human interface device command according to the second operating system.

10. The method for operating a display assembly according to claim 8, wherein the human interface device command is transmitted to the computer through a data transmission line.

11. The method for operating a display assembly according to claim 10, wherein the data transmission line is different from an image transmission line connecting the display and the computer.

12. The method for operating a display assembly according to claim 8, wherein the human interface device command is transmitted to the computer through an infra-red signal.

13. The method for operating a display assembly according to claim 8, wherein the display converts the computer hotkey command into the human interface device command according to a command conversion table.

14. The method for operating a display assembly according to claim 8, wherein the screen adjustment command has a first flag, the computer hotkey command has a second flag, and the display determines whether the received command is the screen adjustment command or the computer hotkey command according to the first flag or the second flag.

15. A display, comprising:
   a judgment unit, used for determining whether a receiver command received from a hotkey controller is a screen adjustment command or a computer hotkey command to determine whether the hotkey controller is in an on-screen display mode or a computer hotkey mode;
   a screen adjustment unit, used for adjusting at least one screen parameter according to the screen adjustment command;
   an instruction processing unit, used for converting the computer hotkey command into a human interface device command; and
   a data transmission unit, connected to a computer, wherein the human interface device command is transmitted to the computer by the data transmission unit for performing a hotkey operation on the computer.

16. The display according to claim 15, wherein the instruction processing unit detects whether the computer adopts a first operating system or a second operating system; if the computer adopts the first operating system, the instruction processing unit converts the computer hotkey command into the human interface device command according to the first operating system; if the computer adopts the second operating system, the instruction processing unit converts the computer hotkey command into the human interface device command according to the second operating system.

17. The display according to claim 15, wherein the data transmission unit is a USB port and transmits the human interface device command through a data transmission line.

18. The display according to claim 17, wherein the data transmission line is different from an image transmission line connecting the display and the computer.

19. The display according to claim 15, wherein the data transmission unit is an infra-red transmission module and transmits the human interface device command through an infra-red signal.

20. The display according to claim 15, further comprising:
   a storage unit, used for storing a command conversion table, wherein the instruction processing unit converts the computer hotkey command into the human interface device command according to the command conversion table.

* * * * *